March 13, 1945.          A. L. SMITH          2,371,270
ELECTRICAL LOGGING OF WELL BORES
Filed July 29, 1940
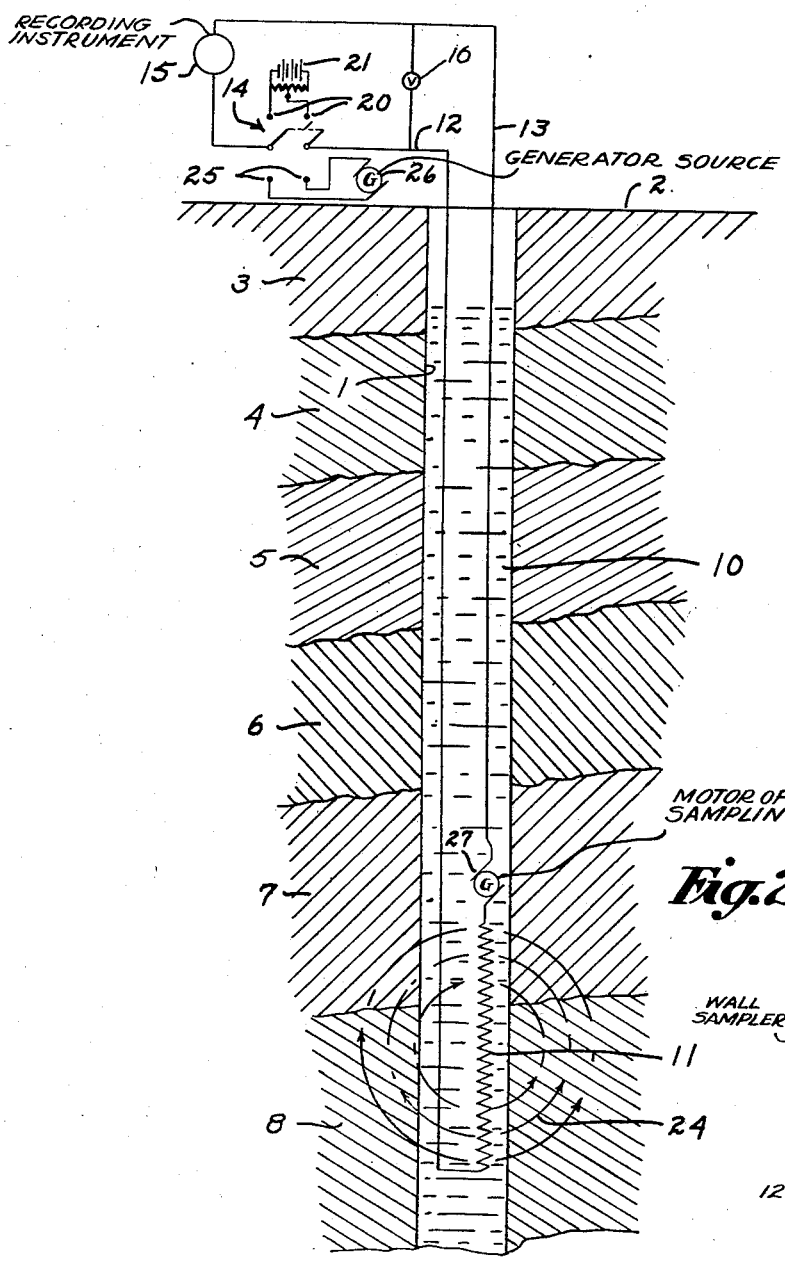
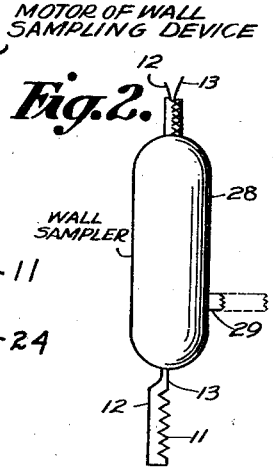
Fig. 1.
Fig. 2.
ALONZO L. SMITH
INVENTOR.
BY
ATTORNEYS Patented Mar. 13, 1945

2,371,270

UNITED STATES PATENT OFFICE 2,371,270

ELECTRICAL LOGGING OF WELL BORES

Alonzo L. Smith, Houston, Tex.

Application July 29, 1940, Serial No. 348,117

3 Claims. (Cl. 175—182)

This invention relates to improved means and method for electrically logging well bores.

In the logging of well bores it has been proposed to lower one or more electrodes within the liquid in the well bore and to apply an electrical potential between an electrode and the earth or between spaced electrodes to establish a localized area of current conduction within the formations of which information is desired. As this area of current conduction is made to traverse the bore hole observations are made of the resistivity of the surrounding formations by measuring the fluctuation in the current or potential within the area, such fluctuations being due to the change in electrical characteristics of the formations and hence serving as an indication of the nature of the formations, particularly as regards potential horizons for the production of oil and gas.

The results obtained by prior practices are, however, obscured by electrical polarization and by earth currents which may be telluric in nature or merely induced strays, such currents introducing spurious indications as to the nature of the formations traversed by the bore hole. Furthermore, the distribution of current resulting from the applied potential may assume such proportions that the definition both as to the nature and extent of the formations is indistinct.

The primary object of the invention is to provide new and improved method and apparatus for logging well bores in a manner that the above indicated difficulties will be avoided.

A more specific object of the invention is to create a localized current condition in and about the well bore in such a manner that polarization is minimized.

A further object is to provide electrical well logging apparatus which is little affected by temperature changes within the well bore.

A further object is to electrically log well bores by utilization of means whereby the effects of fortuitous stray currents are eliminated.

Still another object is to log a well bore by lowering therein a bare and exposed, current carrying resistor so that the voltage drop in such resistor will cause current patterns in the liquid in the well bore and the surrounding formations so that variations in the apparent resistance of the resistor provide an indication as to the nature of the formations.

Still another object is to provide well logging apparatus which is capable of performing additional desired operations within the well bore.

The foregoing objects together with other objects will be further apparent from the following description taken in connection with the accompanying drawing in which:

Fig. 1 is a sectional view through a bore hole and includes an illustrative embodiment of apparatus of the invention;

Fig. 2 is a diagrammatic illustration of a logging unit adapted to procure a sample in the well.

The bore hole 1 passes from the surface 2 of the earth thru the overburden 3 and the subjacent earth formations 4 to 8 inclusive. The principal object of the invention is that of determining the nature and extent of the respective formations 4 to 8, particularly as regards potential productivity of oil or gas or other valuable subsurface materials.

The bore hole 1 is usually partly or entirely filled with a liquid 10 which is electrically conductive and into which, in accordance with the invention, is lowered the elongated resistor 11. The terminals of this resistor are connected to the ends of a conductor cable having insulated wires 12 and 13 which are interconnected thru a double-pole double-throw switch 14 and an electrical instrument 15 by means of which it is possible to obtain an indication or record of the electrical conditions within the well as the resistor 11 is moved axially thereof.

Attention is directed to the fact that a certain amount of stratification may take place in the liquid 10 within the well. In such case it is desirable, though not essential, that a preliminary agitating step be taken in order that this liquid may be relatively homogeneous when a log of the well bore is to be taken.

Connected to the terminals 20 of the double-pole double-throw switch 14 is a source of electrical energy, such source being shown as a battery 21. The other terminals 25 of the switch are connected to a second source 26 of electrical energy of larger capacity to serve a purpose that will be more fully described.

The resistor 11 may be made of any suitable material but preferably comprises a material having a relatively low temperature coefficient of resistance such as constantan or manganin, etc., so that circuit conditions will be inappreciably modified by temperature changes and particularly the changes of the magnitudes which are encountered in extremely deep wells. This resistance is preferably of much greater length than the diameter of the bore hole and in fact if the bore is, say nine and seven-eighths inches in diameter, the resistor may be three to ten feet in length. The resistance of such element would, of course, depend upon the conductivity of the fluid and the natural specific resistance of the element before it is lowered into the well bore. As an illustration, it might have a resistance of from, say, 50 ohms to 500 ohms. This resistor is bare, that is, the surface of the resistance material is exposed throughout its length to the liquid 10 within the well for a distance much greater than the diameter of the well bore so that the voltage applied to the ends of the resistor from the source 21 will cause a current to flow thru the resistor and also throughout an area generally indicated by the lines 24 adjacent thereto in the formation. It is to be noted that the current pattern 24 extends beyond the bore hole and passes through the surrounding earth formations so that the pattern will vary with the variations in the electrical characteristics of the different formations, such as 4 to 8 inclusive. In as much as all other charactertiscs are substantially constant the variations in the formations may be readily detected.

When the liquid 10 is homogeneous, a condition which may be assured by the technique above set forth, the resistance to the flow of current thru the resistor 11 and the liquid 10 is substantially constant. The total flow of current, however, or the apparent resistance of the resistor 11 will vary as the electrical characteristics of the formations vary. These variations may be determined in any of various ways. For example the instrument 15 may comprise an ohmmeter whereby the apparent or effective resistance of the restistor 11 is measured directly. Alternatively the potential applied by the source 21 may be maintained constant as indicated by the voltmeter 16 and an ammeter may be utilized as the instrument 15. It is of course understood that the instrument used may be of either the indicating type or the recording type as desired.

It should also be noted that the current flowing thru the electric circuit may be maintained constant by varying the voltage supplied to the terminals 20 of the switch 14. Under such circumstances the variations in the applied potential will be indicated or recorded to provide the necessary information whereby the electrical characteristics of the geological formations are determined.

Another feature of the invention resides in the fact that the resistor 11 is so constructed that a suitable overload may be applied without injury thereto. This may be accomplished by closing the double-pole double throw switch 14 upon the terminals 25 whereby the output of the generator 26 is applied to the motor 27 and the resistor 11 in series therewith. The heavier current supplied by the generator 26 is sufficient to energize and operate the motor 27 which is an element of a side wall sampling device or other well device or tool of conventional construction such as that shown in United States Patent 2,053,696 and which is lowered as a unit together with the resistor 11. Since the particular structure of such device is unimportant to this invention reference has been made to a disclosure showing a conventional structure for use in the invention. It seems obvious that such construction may constitute a multiple sampling mechanism so that a plurality of samples may be systematically taken as the exploring unit is lowered within the well bore.

In Fig. 2 of the drawing the logging unit is shown diagrammatically as comprising a housing 28 for the motor 27 (Fig. 1) and cooperating mechanism for advancing and retracting a core barrel 29 whereby the desired sample or samples may be taken when the switch 14 is thrown to close the circuit from the generator 26 through the terminals 25 and thence through the conductors 12 and 13, the resistor 11 and the motor 27 so that the core barrel 29 may be advanced to the position indicated in dotted outline in Fig. 2.

The operation of the apparatus above described and the technique of the invention are believed apparent. By way of summary it will be pointed out that if deemed necessary, the liquid 10 may be circulated in such a manner that such liquid is homogeneous. The exploring unit will then be lowered into the well and the switch 14 may be closed upon terminals 20 at such time as is deemed desirable to begin observations. The fluctuations of resistivity of the formations will then be correlated with the travel of the exploring unit axially of the well bore and in this manner it is possible to determine the nature and extent of the various subsurface formations and the levels at which these formations occur.

What is claimed is:

1. The method of determining the nature of geological strata penetrated by a bore hole comprising the steps of, traversing the liquid within the bore hole with a bare resistor of a high resistance material having a low temperature coefficient of resistance, which resistor is elongated axially and of much greater length than the diameter of the bore and connected to an insulated conductor cable, applying an electrical potential through the cable to the ends of the resistor so that current flows through the resistor and through the surrounding media including the earth formations adjacent the resistor, and constantly measuring the apparent resistance of the resistor so that the nature of the traversed formations may be determined from the variations in resistance.

2. The method of determining the nature of geological strata penetrated by a bore hole comprising the steps of, lowering to various known depths within the liquid in the bore hole an elongated bare resistor of much greater length than the diameter of the bore and connected to insulated conductors where the resistor is of a high resistance material having a low temperature coefficient of resistance, applying an electrical potential to said conductors in the mouth of the bore hole whereby an electric current flows through the resistor and through the surrounding media including the earth formations adjacent the resistor, and observing the fluctuations in current through the conductors during the lowering step.

3. An apparatus for logging well bores comprising, a bare resistor, said resistor being of a high resistance material having a low temperature coefficient of resistance, insulated conductors attached to the ends thereof and adapted to lower the resistor within a well bore, a source of electrical energy connected to said conductors, so as to pass a current through the resistor where the resistor is of such greater length than the diameter of the well bore that a substantial part of the current flowing through the conductors to the end of the resistor will flow through the earth formations adjacent the resistor and produce a current pattern in the liquid in the well bore and in the surrounding formations, and means for determining the fluctuations in the current pattern as the resistor is made to traverse the bore hole.

ALONZO L. SMITH.